United States Patent [19]

Masters

[11] 3,840,815

[45] Oct. 8, 1974

[54] PROGRAMMABLE PULSE WIDTH GENERATOR

[75] Inventor: Harvey M. Masters, Ellicott City, Md.

[73] Assignee: Westinghouse Electric Corporation, Pittsburgh, Pa.

[22] Filed: June 14, 1973

[21] Appl. No.: 370,114

[52] U.S. Cl. .................... 328/58, 307/265, 328/48

[51] Int. Cl. .................... H03k 5/04

[58] Field of Search .................... 307/265; 328/58, 48

[56] References Cited

UNITED STATES PATENTS

| | | | |
|---|---|---|---|
| 3,614,632 | 10/1971 | Leibowitz et al. | 328/58 |
| 3,629,710 | 12/1971 | Durland | 328/58 |
| 3,697,879 | 10/1972 | Holliday | 307/265 |

*Primary Examiner*—Stanley D. Miller, Jr.
*Attorney, Agent, or Firm*—J. B. Hinson

[57] ABSTRACT

A system for generating a digital signal comprising a sequence of pulses is disclosed with the first pulse of the sequence having a predetermined width which is sequentially increased by increments until the final pulse width is reached. When the maximum pulse width is reached, the sequence is automatically restarted. Each of the pulses comprising the digital signal is formed from a combination of a plurality of shorter pulses. These shorter pulses are combined in a special circuit to generate the digital signal which consists of a single pulse during each sequence. The system can also be easily modified to generate a digital signal comprising sequences of pulses which begin with a predetermined pulse width and decrease in equal increments until a final pulse width is reached. Provisions are also included for acceptance of a hold signal thereby permitting a sequence of constant width pulses to be generated.

7 Claims, 8 Drawing Figures

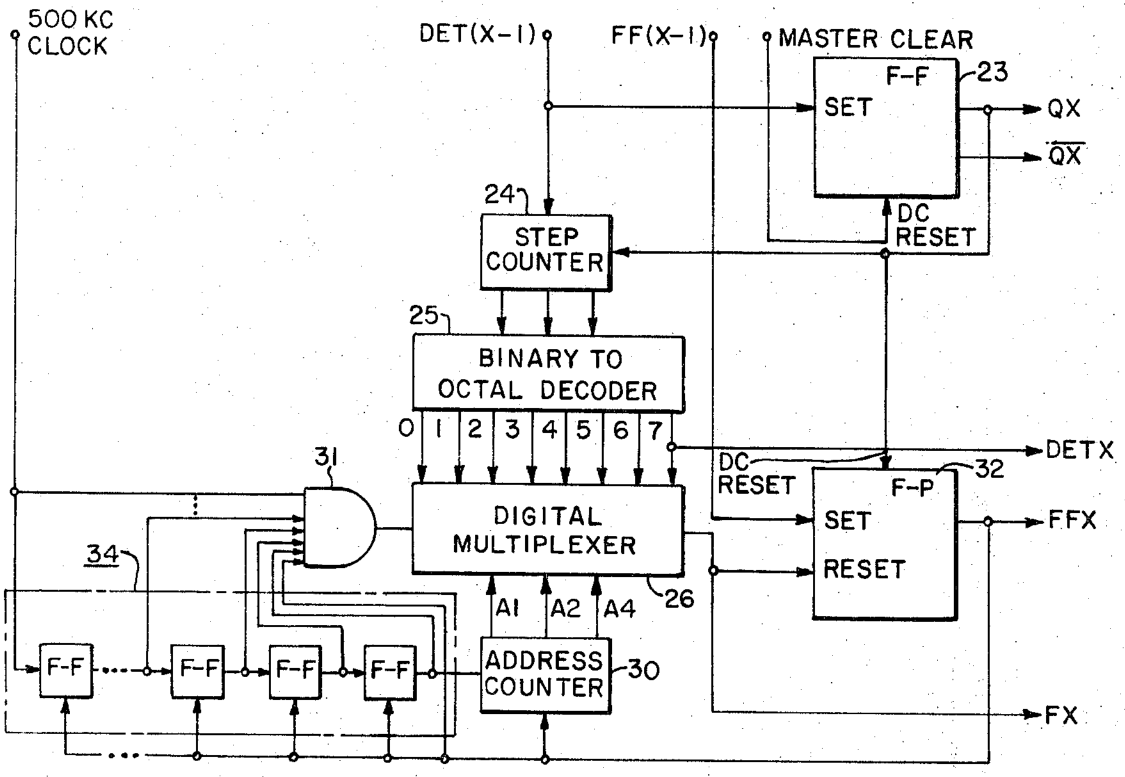
FIG. 3
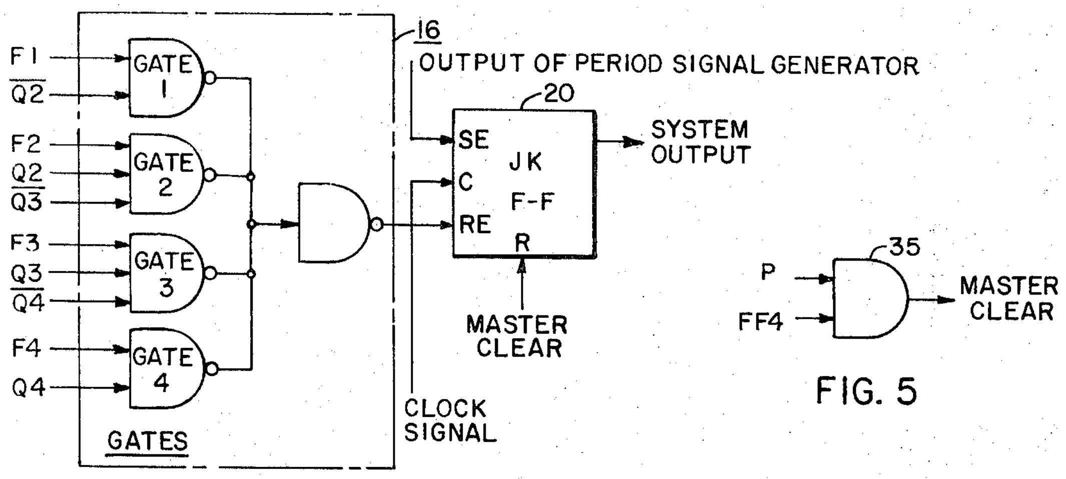
FIG. 5
FIG. 4
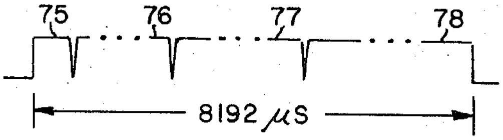
FIG. 8

PROGRAMMABLE PULSE WIDTH GENERATOR

BACKGROUND OF THE INVENTION

Field of the Invention

The invention relates to pulse generators and more particularly to a system for generating a digital signal comprising a sequence of pulses with the pulse width of adjacent pulses changing by a predetermined value.

SUMMARY OF THE INVENTION

The disclosed pulse generator comprises a plurality of pulse circuits. Each of these pulse circuits generates a variable or programmable width basic pulse. These pulse circuits are series coupled such that the trailing edge of the output pulse of the preceding circuit initiates the succeeding circuit. All of the basic pulses are combined in a special circuit to generate a composite digital signal which is the output signal of the pulse generator.

A flip-flop is set coincident with a reference clock signal to indicate the beginning of each of the pulses generated by the first pulse circuit of the series. This flip-flop is reset coincident with the clock signal to indicate the completion of the last pulse to be generated during that given period. This last pulse may be from any one of the four pulse circuits. The output signal of this flip-flop is the pulse generator output signal.

The accuracy of the width of each output pulse is the same as that of the reference clock. Each of the circuits comprising the pulse generator includes first and second counters. These counters in conjunction with a clock signal generator determined the pulse widths of the pulses generated by the circuits. The first counter specifies the number of clock pulses necessary to define the pulse width of the associated pulse circuit. The counter associated with the first pulse circuit is incremented at the beginning of each cycle. The counters associated with the other pulse circuits are incremented each time the preceding pulse circuit concludes the generation of its maximum width pulse. The second counter begins counting clock pulses when the associated pulse circuit is initiated. This counter, in association with a digital multiplier circuit, causes to be generated a signal which terminates the pulse when the proper number of pulses of the clock signal have elapsed.

Since each of the succeeding series coupled pulse circuits is designed to generate increasingly wide pulses, the counter in each succeeding circuit differs in that the counter used to count the clock pulses has more stages.

DESCRIPTION OF THE DRAWINGS

FIG. 3 is a functional block diagram of the pulse circuit used in the second and succeeding stages of the pulse generator;

FIG. 4 is a logic diagram of the circuit for combining the output pulses of the pulse circuits to produce the output signal of the pulse generator;

FIG. 5 is a logic diagram of the circuit used to generate the master clear signal;

FIG. 8 is a pulse diagram illustrating how the output signals of the various pulse circuits are combined to generate the output signal.

DETAILED DESCRIPTION OF THE INVENTION

Figure 1:
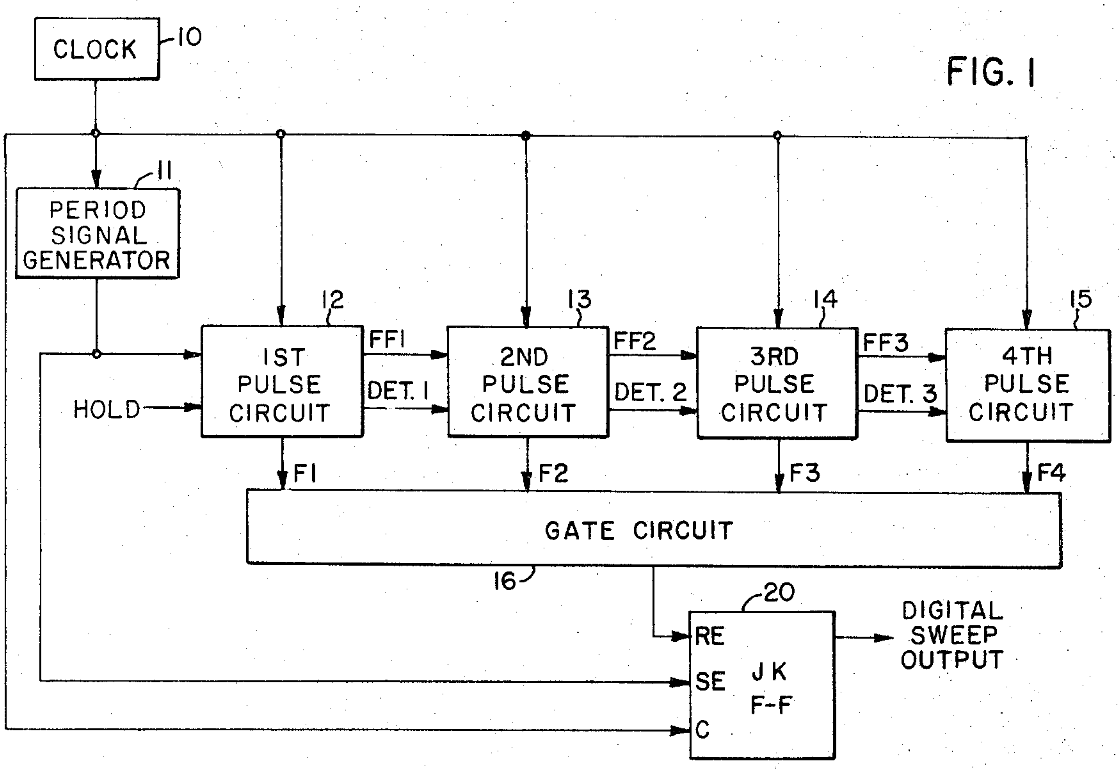
FIG. 1 is a functional block diagram of the pulse generator comprising the invention.

A functional diagram of the preferred embodiment of the pulse generator is illustrated in FIG. 1. The basic timing signal for the pulse generator is provided by a clock signal generator 10. The output signal of the clock generator 10 is coupled to a period signal generator 11 and pulse circuits 12 through 15. The output signal of the pulse circuits 12 through 15 are coupled to the input of a gate circuit 16. The output signals of the gate circuit 16, the period signal generator 11 and the clock signal generator 10 form input signals to a JK flip-flop 20. The output signal of JK flip-flop 20 is the output signal of the pulse generator.

Figure 2:
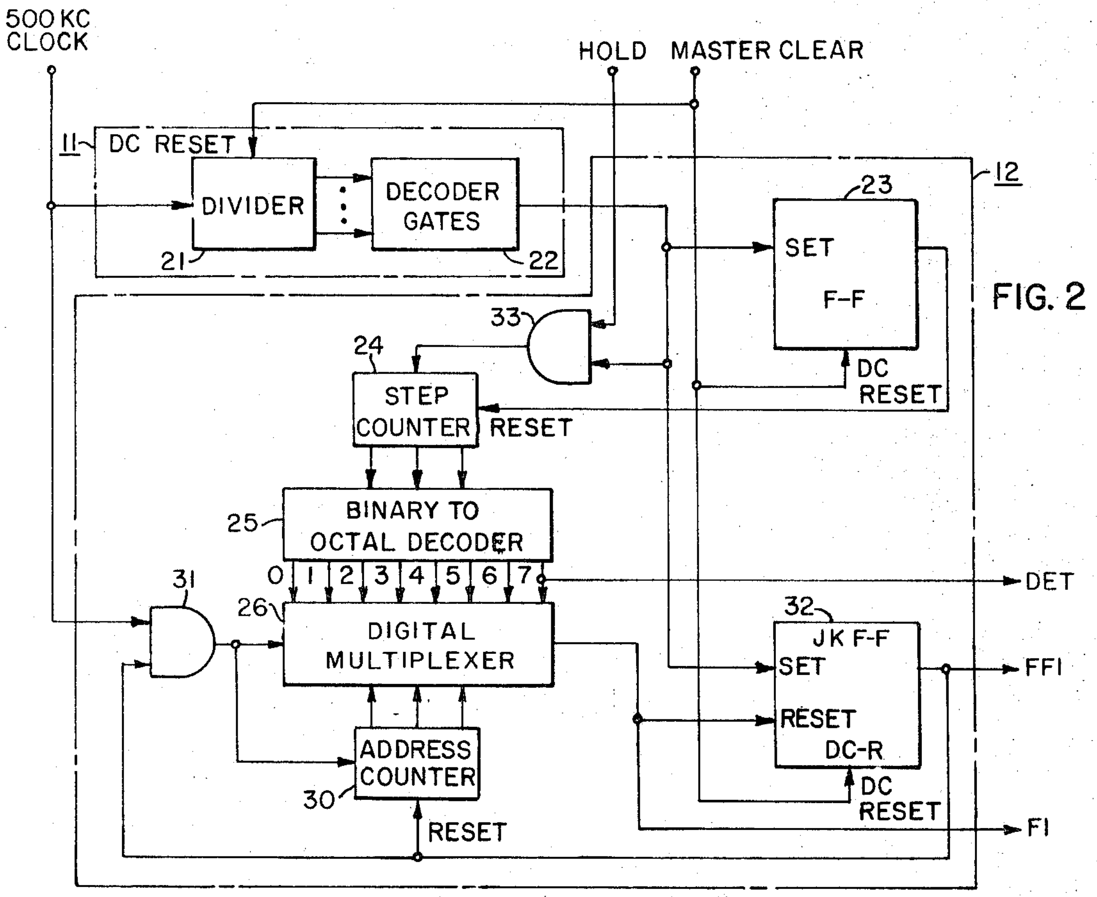
FIG. 2 is a functional block diagram of the first pulse circuit.

FIG. 2 is a more detailed diagram of the period signal generator 11 and the first pulse circuit 12. The period generator 11 consists of a divider 21 and decoder gates 22 to generate a pulse corresponding to a predetermined number of pulses of the 500 kc systems clock signal generated by the clock signal generator 10. The elapsed time between successive output pulses of the period generator 11 defines the maximum pulse width of any pulse of the digital output signal.

The output signal of the period generator 11 is also coupled to the set input terminal of a trailing edge flip-flop 23. (A trailing edge flip-flop in a two state circuit which changed state on the trailing edge of an input signal.) The trailing edge of the P pulse causes this flip-flop 23 to be turned on causing the output of this flip-flop to go to a logic ONE. The logic ONE output signal of this flip-flop 23 enables the reset input to step counter 24 of the pulse circuit so that it may begin counting upon the arrival of the second P pulse. (Step counter 24 is held reset whenever the output of JK flip-flop 23 is ZERO.) The output signals of the step counter 24 are coupled to a binary-to-octal decoder 25. The output signals of the binary-to-octal decoder 25 are coupled to the input of a digital multiplexer 26. The digital multiplexer 26 receives a second group of input signals from an address counter 30 and an inhibit signal from a gate circuit 31.

The output signal of a second trailing edge flip-flop 32 forms the output signal of the first pulse circuit 12. This signal is designated (FF1) in FIGS. 2 and 6. The set input terminal of this flip-flop is coupled to the output of the P generator 11, and the reset input terminal is coupled to the output signal of the digital multiplexer 26. This causes the output signal (FF1) of the first pulse circuit to switch to a logic "1" on the trailing edge of the P pulse and to a logic "0" on the trailing edge of the inhibit pulse which passes through the digital multiplexer 26 when the address counter 30 counts to that same number stored in the step counter 24. Following the arrival of a master clear signal and until the arrival of the second P pulse, the output of the step counter 24 associated with the first pulse circuit 12 is a binary zero.

In normal operation the output signal of the pulse generator illustrated in FIG. 1 will begin with a pulse having a width of 2 microseconds and increase in two microsecond increments with the arrival of each P pulse until a pulse width of 8192 microseconds is generated. At this point the pulse generator automatically resets to begin a new similar cycle. A hold signal shown in FIG. 2 can also be coupled to the system to cause the width of the output pulse of the system to remain constant. This signal inhibits further incrementing of the step counter 24 of the first pulse circuit 12. This is accomplished by coupling the output signal of the period signal generator 11 to the increment line of the step counter 24 through a gate 33. A second input to the gate 33 is a hold signal. Gate 33 is an AND gate and operates such that the output signal of the period signal generator 11 is only coupled to the step counter 24 when a logic 1 is coupled to the hold signal input terminal. This causes the step counter 24 to be incremented in a normal manner. Whenever the hold signal is a logic ZERO, gate 33 is disabled and step counter 24 is held at a constant value. Since the step counter 24 specified the width of the output pulse from the first pulse circuit 12, holding the step counter 24 constant causes the first pulse circuit 12 to generate a sequence of constant width pulses and inhibits incrementing the step counter associated with the other pulse circuits. The time relationship of the various signals generated by this circuit will be explained in detail later.

FIG. 3 is a more detailed functional block diagram of the pulse circuit used in the second and subsequent stages. Major portions of this circuit are identical to the components of the first pulse circuit 12 and therefore the same reference numerals are used to identify similar parts in FIGS. 2 and 3. Only the new and additional parts required in the second and subsequent pulse circuits 13 through 15 have been assigned new reference numerals. This is believed to simplify the understanding of the similarities and differences between the pulse circuits used in the various stages illustrated in FIG. 1. It should also be noted that although the first and subsequent pulse circuits utilize many similar components, the inputs to the second and subsequent stages are different from those in the first stage. These differences will be pointed out in more detail in the following discussion.

The major difference between the first and subsequent pulse circuits is an additional counter which is interposed between the 500 kc clock signal and the address counter 30. These additional counters cause the address counter 30 to be incremented at one-eighth the clock frequency for the second pulse circuit, 1/64th of the clock frequency for the third pulse circuit and 1/512th of the clock frequency for the fourth pulse circuit. This lower counting rate causes each succeeding circuit to generate progressively longer pulses. Gate 31 has also been expanded and the output signals of counter 34 coupled to these additional inputs so that the digital multiplexer 26 is inhibited until the address counter 30 has reached the proper value. The detailed time relationships between the various signal generated by this circuit will be explained in detail later.

The logic diagram of the circuit for combining the output signals of pulse circuits, 12 through 15, to generate the output signal of the pulse generator is illustrated in FIG. 4. The output signals of the pulse circuits, 12 through 15, are combined in a gating circuit 16 to form a reset enable signal for a JK flip-flop 20. This flip-flop is set on the trailing edge of the clock pulse when the output pulse of the period generator 11 appears at its set enable input. It resets on the trailing edge of the clock pulse when all sections 12 through 15 complete their outputs, for that period. The determination of that exact time is the function of gates 16, the output of which enables the rest input of flip-flop 20. This combining circuit, consisting of gate 16 and flip-flop 20, accomplishes two functions. First it prevents the occurrence of commutation spikes in the output waveform which would occur if the outputs were combined in a simple gate circuit. And secondly, it eliminates all propagation delays which occur through the various dividers, gates, etc. in each section. Thus, except for the negligible propagation delay of a single flip-flop 20, the edges of the pulse generator output waveforms are in exact coincidence with these of the clock waveform. Consequently the timing of the output waveform is as precise as that of the clock.

FIG. 5 illustrates a logic circuit for detecting when the pulse generator output waveform reaches its maximum width. When the width of the pulse generated by the last pulse circuit 15 extends to include the next output pulse of the period generator 11 the gate 35 generates a master clear pulse which resets all of the flip-flops in pulse circuits 12 through 15. This momentarily places all of the pulse circuits, 12 through 15, in the reset state. The entire process is then repeated, beginning with an output pulse 2 microseconds wide.

This master clear circuit is a two input gate circuit 35 which has one input coupled to the output signal (FF4) of the last pulse circuit. The other input is coupled to the output signal of the period generator 11. If less than four pulse circuits are to be used, the output from the last pulse circuit is used instead of the FF4 signal.

Figure 6:
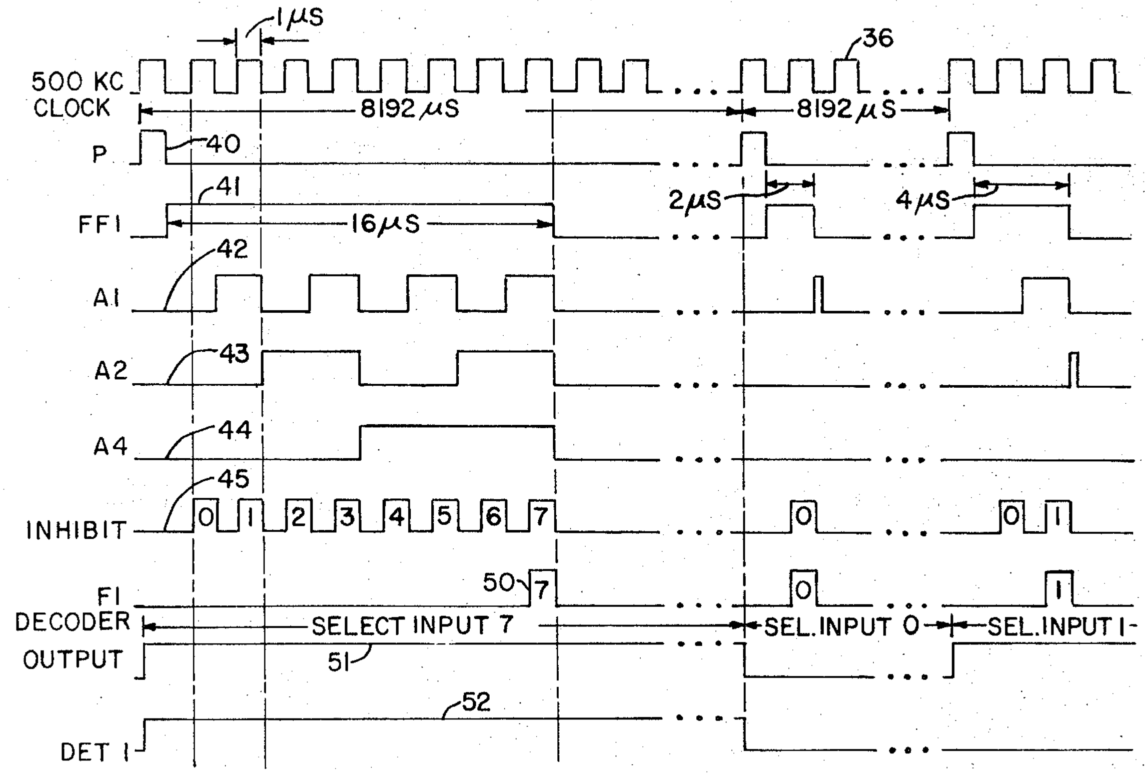
FIG. 6 is a diagram illustrating the waveforms of the first pulse circuit.

FIG. 6 is a waveform diagram for the first pulse circuit 12 of the system. This pulse circuit has been previously mentioned and is illustrated in detail in FIG. 2.

The basic timing for the system is determined by a clock generator 10 (FIG. 1) which generates a substantially symmetricaly 500 kc clock signal. This signal is illustrated at reference numeral 36 of FIG. 6. The clock signal is divided down by the period signal generator 11 to generate a sequential group of time impulses spaced 8192 microseconds from each other with each pulse having the same width as one pulse of the clock signal. These pulses have been designated "P" pulses. A typical P pulse is illustrated at reference numeral 40 of FIG. 6.

The output signal from the first pulse circuit 12, which is the output signal of flip-flop 32, is designated (FF1) and is illustrated at reference number 41 of FIG. 6. This pulse has a variable width which begins with 2 microseconds and sequentially increases in 2 microseconds increments until the maximum pulse width of 16 microseconds is reached. When the maximum pulse width is reached the pulse circuit recycles beginning with the 2 microsecond width. FIG. 6 illustrates the 16 microsecond pulse followed by the 2 microsecond pulse and the 4 microsecond pulses. FIG. 6 also illustrates the fact that the leading edge of the output pulse of the first pulse circuit 12, FF1, rises with the trailing edge of the P pulse and that the P pulses are always spaced 8192 microseconds from each other. The spacing of the P pulses determines the period of the pulse generator. the period of the pulse generator can be changed by modifying the frequency of the clock or the design of the pulse circuits, 12 through 15.

The output signals of the address counter 30 are illustrated at reference numerals 42 through 44 of FIG. 6. The address counter 30 is a three stage binary counter. The waveforms illustrated in FIG. 6 are the output signals of the first, second and third flip-flops of this counter.

An inhibit signal is generated by a gate circuit 31 from the clock signal and the (FF1) signal. This inhibit signal, illustrated at reference numeral 45, is an input signal to both the digital multiplexer 26 and the address counter 30. It inhibits the address counter 30 from being incremented anytime except when the output pulse (FF1) is present. This is necessary because the basic purpose of the address counter 30 is to measure the width of the (FF1) pulse in terms of a specific number of pulses of the clock signal. This measurement process is accomplished with the aid of step counter 24 of FIG. 2 whose three outputs represent one of eight binary numbers from 0 through 7, depending upon the number of P pulses which have arrived. Each time (FF1) occurs, the address counter 30 begins a new count cycle, starting with a binary output of 0 and counting towards 7. When the address counter output reaches the number stored in the step counter 24, the pulse from gate 31 is allowed to pass through the digital multiplexer 26. The trailing edge of this pulse is a sign that FF1 has reached the desired width for that particular period. The trailing edge of the output signal of the digital multiplexer 26 resets flip-flop 32 and terminates the output signal (FF1) of the pulse circuit. The output signal of the digital multiplexer 26, F1, is illustrated at reference number 50 of FIG. 6.

The binary-to-octal decoder 25 converts the binary output of step counter 24 to the octal inputs required of the digital multiplexer 26. When the step counter 24 reaches its maximum value of 7 and then again returns to 0, the subsequent pulse circuit is enabled. The enabling signal supplied to the second pulse circuit is the "7" output of the binary-to-octal decoder 25. This signal is labeled DET and is illustrated at reference numeral 52 of FIG. 6.

Figure 7:
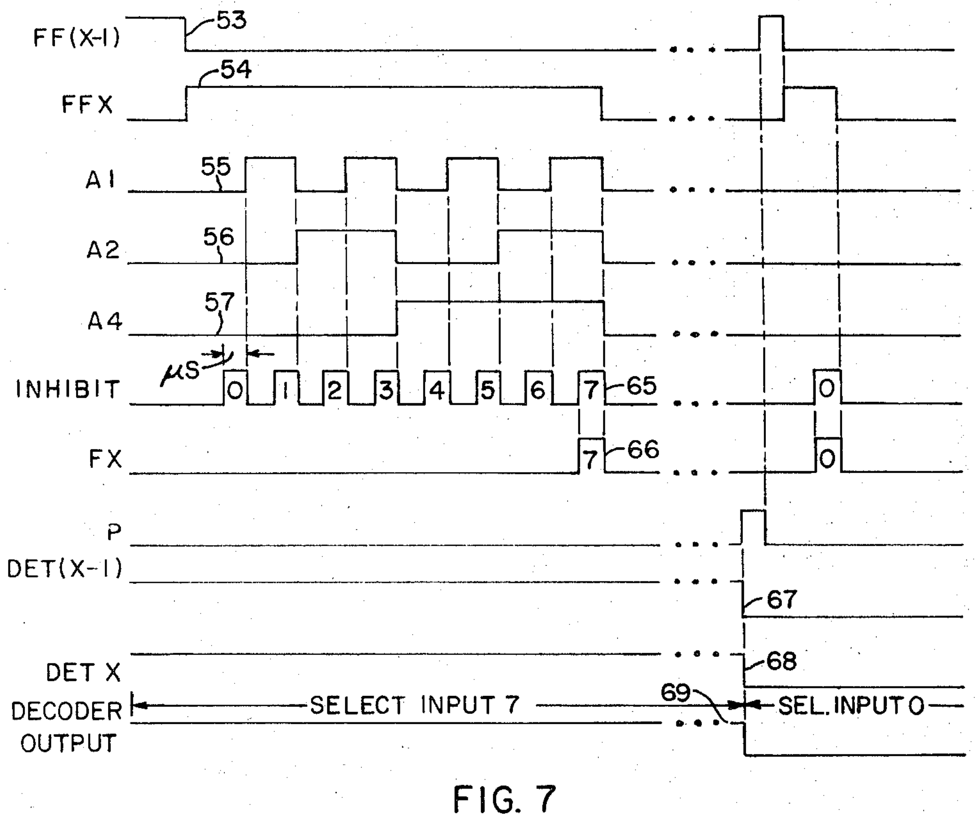
FIG. 7 is a waveform diagram illustrating the waveforms generated by the second and succeeding pulse circuits.

FIG. 7 illustrates generalized waveforms of the second and subsequent pulse circuits 13 through 15. The only difference between the pulses generated by the second and subsequent pulse circuits is the width of the pulses. Each successive circuit generates pulses having minimum and maximum widths eight times the corresponding pulses generated by the preceding circuit.

The waveforms of FIG. 7 begin with the time where the contents of the step counter 24 of FIG. 3 is such that the width of the output pulse FFX of FIG. 3, is maximum. This corresponds to a point where the count stored in the step counter 24 equals 7.

As previously described one primary difference between the first and subsequent pulse generators is an additional counter 34 which reduces the rate at which the address counter 30 is incremented. This causes the output pulse generated by the second and subsequent pulse circuits, 13 through 15, to be longer in time than the pulse output from the first pulse circuit. The amount of increase in the pulse width of the second and subsequent pulse circuits is determined by the number of stages in the counter 34. The time relationship between the pulses of a given pulse circuit X and those of a previous circuit (X-1) as illustrated in FIG. 7. For example, the FF (X-1) signal which is the basic output pulse from the previous circuit is illustrated at reference numeral 52 while the basic output pulse of the subsequent stage (FFX) is illustrated at reference numeral 54. This figure clearly illustrates that the trailing edge of the FF (X-1) pulse from the previous stage is substantially coincident with the leading edge or the FFX pulse of the next stage.

The outputs of the address counter 30 of the second and subsequent pulse circuits are illustrated at reference numerals 55 through 57. FIG. 7 also illustrates that at the beginning of the next period following the maximum pulse width of a given pulse circuit, the step counter 24 of FIG. 3 switches its output from 7 to 0 as a result of the DET (X-1) signal from the preceding pulse circuit. In a like manner, each time the step counter of pulse circuit (X-1) cycles through a count from 0 to 7, the step counter of pulse circuit (X) will be incremented one count. That is, step counter (X) counts once for every eight counts of step counter (X-1).

The inhibit signal for the second and subsequent counters is generated by decoding the output of the step down counter 34 of FIG. 3 and combining this signal with the FFX and systems clock signal. The inhibit signal is illustrated at reference numeral 65 in FIG. 7 and functions similar to the inhibit signal for the first pulse generator 12 previously described.

The combination of the FX and QX signals from all pulse circuits enables the resetting of flip-flop 20 (FIG. 4) to terminate the output pulse of the pulse generator. The time relationship between the FX pulse and the other signals is illustrated in FIG. 7 with a typical FX pulse being illustrated at reference numeral 66. It is the function of the "Q" flip-flops, 23, in pulse circuits 13, 14 and 15 to hold those pulse circuits disabled until the proper time for them to become active. For example, after pulse circuit 12 generates its maximum width pulse of 16 microseconds for the first time, pulse circuit 13 will be enabled and will remain enabled until the master clear signal is automatically generated at the end of the cycle. With respect to the gate circuit 16 of FIG. 4, gate 1 has an output pulse only when pulse circuits 13, 14, and 15 are inactive. Gate 2 has an output only when pulse circuits 14 and 15 are inactive. Gate 4 has an output only when all four pulse circuits are active.

The time relationship between the DET output signals from the previous and subsequent pulse circuits at a point in the cycle when each of the pulse circuits, 12 through 15, is generating a pulse having a width equal to the maximum width that the respective circuits are capable of generating, are respectively illustrated at reference numerals 67 and 68 of FIG. 7. In a similar fashion the output from a typical binary-to-octal decoder 25 is illustrated at reference numeral 69. This completely defines the time relationship between the signals generated by the various pulse circuits because the FF (X-1) signal initiates the subsequent circuit and the DET signal increments the step counter 24 to vary the width of the pulse generated.

FIG. 8 illustrates the timed relationship between the FFX signals of the various pulse circuits. For example the pulses from the first through the fourth pulse circuits respectively are illustrated at reference numerals 75 through 78. These signals are illustrated at a point in time when the output signal of the pulse generator has its maximum width of 8192 microseconds. At other times in the cycle, the relative width of the various pulses will change such that the width of the combined pulse is proper. It should be noted that there would be commutation transients between adjacent pulses if the outputs of the four pulse circuits were simply combined as illustrated in FIG. 8. However, by combining selected signals of the various pulse circuits in a gating circuit 16 and connecting them to a flip-flop 20, as illustrated in FIG. 1 and shown in detail in FIG. 4, the commutation transients do not exist. Also, because of the circuit of FIG. 4, the pulse generator waveform edges are in coincidence with the clock pulses. This eliminates substantially all of the accumulated circuit delays. Flip-flop 20 sets on the trailing edge of the clock signal whenever the P pulse appears at the set-enable input. (This action eliminates the delay between the trailing edge of the P pulse and the trailing edge of the clock pulse, the delays having been caused by signal propagation through the circuits which produced the P pulse.) Flip-flop 20 resets on the trailing edge of the clock signal whenever the reset enable input is high as determined by gating circuit 16. Gating circuit 16 produces a pulse each period at a time near the completion of the FFX pulse from the last pulse circuit to produce a pulse for that period.

The output from the first pulse circuit begins with 2 microseconds and continually increases in 2 microseconds steps until a maximum pulse width of 16 microseconds is reached. This is represented by pulse 75 of FIG. 8. The pulse output from the second pulse generator illustrated at reference number 76 of FIG. 8 begins with 16 microseconds and increments in eight, 16 microsecond steps until it reaches a maximum pulse width of 128 microseconds. Similarly the pulse outputs of the third and fourth pulse generators illustrated at reference numerals 77 and 78 respectively begin with a 128 and 1024 microsecond pulse respectively and increase in eight equal steps to generate pulses having maximum widths of 1024 and 8192 microseconds respectively.

The above described preferred embodiment of the pulse generator can easily be modified to generate a sequence of pulses with the first pulse having a specified width which decreases in two microseconds increments to zero. This is basically done by modifying the step counter 24 of each of the pulse circuits so that it is set to its maximum value at the beginning of the cycle and then decrementing it instead of incrementing it.

The first pulse circuit includes provision for accepting a hold signal which prohibits further incrementing of the step counter in all sections. This enables pulse trains with each pulse having the same width to be generated in response to an external signal. By synchronizing the hold signal with the output signal of the pulse generator, the width of the output signal of the generator can be selected to have any value within the capability of the pulse generator.

From the previous discussion it is obvious that a very flexible pulse generator has been described. The pulse generator can be used to generate pulses of a constant width or it may be used to generate a series of pulses that either increment or decrement at a predetermined rate. The resolution of the system is determined by the width of the smallest increment (2 microseconds for the system example presented), and by the width of the period (8192 microseconds for the example). In other words, the resolution is the number of increments which make up one complete cycle. For the example given, the resolution is one part in 4096. Thus, if used as a controlling device, any one of 4096 selections can be made. An example would be in an application where the pulse generator is used to control the frequency of a variable frequency oscillator. The oscillator frequency can be made to sweep over a predetermined range of frequencies while using the pulse generator as the controlling device. Also the oscillator can be stopped and held at any one of 4096 frequencies within that range.

When used as a programmable pulse generator, any one of 4096 pulse widths can be selected. Adding additional pulse circuits (similar to those of 13, 14 and 15) will increase the resolution. The resolution will be increased by a factor of 8 for each pulse circuit added. Because the generator waveform is in precise synchronism with the clock edges, the waveform has the same high accuracy and stability as that of the reference clock. This feature is useful in applications where the timing of events are related to the occurrence of the sweeping wavefront. Wider pulses can be generated by adding additional stages to the system. In other words, the clock frequency, period length, and number of pulse circuits can be varied to produce other resolutions, pulse widths, and sweep rates. This flexibility allows the various parameters of the systems output signal to be optimized to fit the specific application.

I claim as my invention:

1. A pulse generator for generating a digital signal, said digital signal including a plurality of programmable width pulses, said generator comprising:

a. a plurality of serially coupled pulse circuits for generating basic pulses, each of said pulse circuits including; (1) a first counter for specifying the width of the basic pulse currently being generated in terms of a number of cycles of a clock signal, (2) a second counter for counting the pulses of said clock signal, (3) means for selectively incrementing said first counter, (4) means for comparing the contents of said first and second counters to generate a timing signal which defines the width of the basic pulse to be generated by the associated pulse circuit; and b. combining means responsive to the output signals of said pulse circuits to generate the pulses of said digital signal such that the width of each pulse of said digital signal is substantially equal to the sum of the widths of the basic pulses combined to form the associated pulse of said digital signal.

2. A pulse generator in accordance with claim 1 wherein: said combining means includes a gate circuit coupled to receive the output signals of said pulse circuits and a flip-flop responsive to the output signal of said gate circuit, such that the output signal of said flip-flop is the output signal of said pulse generator with each pulse of said output signal being free of commutation spikes and equal to sum of the widths of the individual pulses generated by said pulse circuits.

3. A pulse generator in accordance with claim 1, each of said pulse circuits including a binary decoder for decoding the contents of said first counter to generate an output signal which indicates that the associated pulse circuit is generating a pulse having a maximum width pulse.

4. A pulse generator in accordance with claim 3 wherein the output signal of said binary decoder is utilized to increment said first counter of the subsequent pulse circuit.

5. A pulse generator in accordance with claim 4 wherein said second counter of each subsequent pulse circuit includes additional stages, said additional stages being operable to increase the width of each subsequent circuit by a time period equal to a predetermined number of cycles of said clock signal.

6. A pulse circuit for generating a digital signal with each subsequent pulse increasing in width by a predetermined amount until a maximum width is reached and then recycling beginning with a selected minimum width comprising:

a. a first counter for specifying the width of the pulse currently being generated in terms of a number of cycles of a clock signal;

b. a second counter for counting the cycles of said clock signal to generate a signal which specifies a time interval substantially equal to the width of the pulse currently being generated by said pulse circuit;

c. synchronizing means for periodically incrementing said first counter and resetting said second counter; and d. compare means for comparing the contents of said first and second counters to generate a comparison signal;

e. output means responsive to said synchronizing means and said compare means to generate the pulses comprising said digital signal.

7. A pulse circuit in accordance with claim 6 further including means to reset said second counter when said compare signal indicates that the contents of said first and second counters are equal.

* * * * *